March 19, 1957 W. J. GRACE 2,786,107
SIGNAL CONTROL FOR VEHICLES
Filed Dec. 14, 1954 2 Sheets-Sheet 1

INVENTOR.
WILLIAM J. GRACE,
BY
ATTORNEYS.

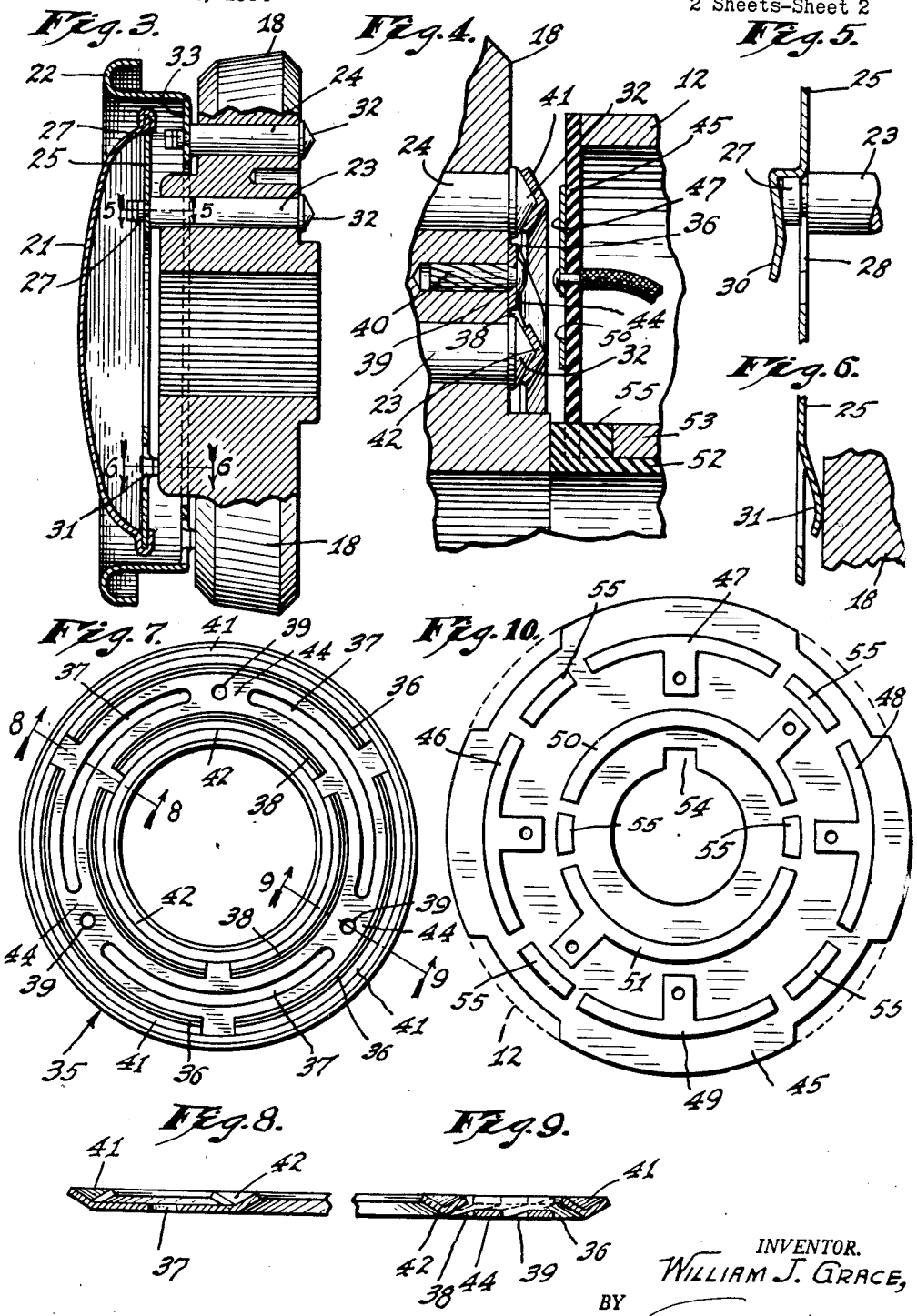

United States Patent Office 2,786,107
Patented Mar. 19, 1957

2,786,107

SIGNAL CONTROL FOR VEHICLES

William J. Grace, Lafayette, Ind., assignor to Ross Gear and Tool Company, Lafayette, Ind., a corporation of Indiana Application December 14, 1954, Serial No. 475,170

8 Claims. (Cl. 200—61.54)

This invention relates to signal-controlling means adapted for mounting on the steering column of an automotive vehicle. It is common to mount on the steering wheel of an automobile vehicle a button for controlling the horn; but the controls for other signals, such as direction indicators, are commonly mounted exteriorly of the steering column below the wheel. The wheel mounting of a signal control has several advantages, such as accessibility and the promotion of a clean appearance; but the fact that the steering wheel must be rotated in operation of the vehicle is a deterrent to such mountings except in the case of a relatively simple control such as a horn button.

It is an object of this invention to produce electrical switch mechanism selectively operable by a steering-wheel mounted control member or members to control a plurality of electrical circuits embodying electrically operated signaling devices. A further object of the invention is to produce a steering-wheel mounted control unit which can readily be embodied in steering columns of standard construction.

In carrying out my invention, I form the steering wheel hub with a disk-like insert through which the steering wheel is supported from the steering shaft. Extending through such insert are one or more annular series of thrust members arranged for movement independently of each other parallel to the steering-shaft axis. At their outer or upper ends, each series of thrust members is connected to a control member supported from the thrust members and tiltable about any axis radial of the steering wheel to depress the thrust members selectively. Secured to the lower side of the insert I provide a contact ring having a number of contactor segments individually engaged by the thrust members. A contact plate of insulating material is stationarily supported from the steering column beneath the contact ring, such contact plate carrying annular series of circumferentially extending contacts selectively engageable by the contactor segments of the contact ring. The contact ring is grounded through its mounting on the steering-wheel insert, and the stationary contacts on the plate are connected in the signaling circuits. By depressing either of the control members at the proper point in its circumference, any selected stationary contact may be engaged by a grounded contactor segment to complete a signal-controlling electrical circuit.

In the accompanying drawings, which illustrate a preferred embodiment of the invention:

Fig. 3 is an axial section on the line 3—3 of Fig. 1;

Fig. 4 is a fragmental section similar to Fig. 3 but on an enlarged scale;

Figures 1, 2:
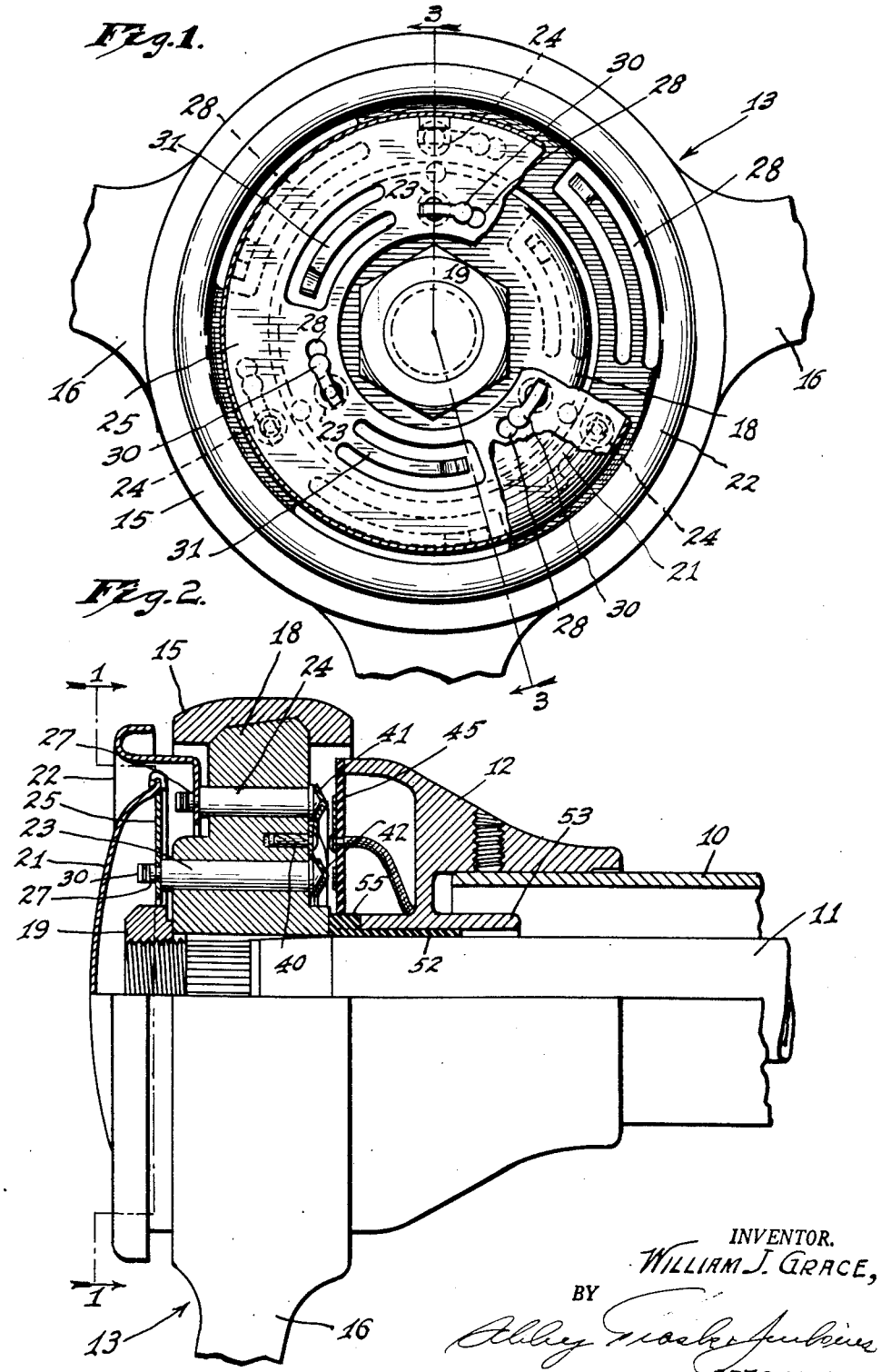
Fig. 1 is a fragmental end elevation of a steering wheel in partial section on the line 1—1 of Fig. 2.
Fig. 2 is a side elevation of the upper end of a steering column in partial section.

Figs. 5 and 6 are fragmental sections on an enlarged scale taken respectively on the lines 5—5 and 6—6 of Fig. 3;

Fig. 7 is a plan view of the contact ring;

Figs. 8 and 9 are enlarged-scale sections on the lines 8—8 and 9—9 respectively of Fig. 7; and Fig. 10 is a plan view of the stationary contact plate.

As in the conventional steering column, the device shown in Figs. 1 and 2 comprises a tubular steering post 10, a rotatable steering shaft 11 extending through such post, a shroud collar 12 secured to the upper end of the steering post and providing support for the upper end of the steering shaft, and a steering wheel, designated in its entirety by the reference numeral 13, secured to the steering shaft beyond the collar 12. The steering wheel comprises an annular hub portion 15 and integral spokes 16 radiating to a rim (not shown). Embodied in and rigid with the hub is a disk-like insert 18 having a central opening which receives the upper end of the steering shaft 11. The insert 18, and with it the steering wheel, is secured in fixed position on the shaft 11 by a nut 19. As so far described, the construction illustrated in Figs. 1 and 2 is more or less conventional.

In the specific embodiment of the invention herein disclosed, two independently operable control members are contemplated. One of these is a centrally disposed horn button 21 in the form of a dished metal disk and the other is an annular ring 22 spaced from and surrounding the horn button 21. The latter control member is employed to actuate a signaling device, such as a directional signal or turn indicator. In their normal positions, illustrated in Fig. 2, the control members lie parallel to each other and to the plane of the steering wheel; but either may be depressed at any selected point in its circumference to tilt it and actuate a signal as hereinafter set forth.

The horn button 21 is supported from the outer ends of an annular series of thrust members or pins 23, shown as three in number, which are slidably mounted in the insert 18 for movement in a direction parallel to the axis of the shaft 11. A similar series of pins 24, also mounted for axial sliding movement in the insert 18, support the control ring 22. For connecting the horn button 21 to the pins 23 its peripheral portion may be formed to embrace the circular edge of a horn-button base 25 which is removably secured to the outer ends of the pins 23. As shown each pin 23 is provided at its outer end with an annular groove defining a head 27 (Fig. 5), and the base 25 is provided with an annular series of circumferentially extending slots 28 of a general key-hole shape, each having an enlarged end through which the head 27 of an associated pin 23 may pass. The narrower portion of each slot 28, into which the neck of the pin 23 may be moved after the head 27 has been passed through the enlarged end of the slot, has a width less than the diameter of the head 27, so that when the necked portion of a pin 23 occupies the narrower portion of a slot 28 the base 25 and the pin will be interconnected for joint movement in either direction axially of the steering column. The material removed in forming each slot 28 is not severed from the base 25 but instead is struck out to form a resilient tongue 30 bent as shown in Fig. 5 to form a detent resiliently retaining the end of the pin 23 in the narrow end of the slot 28.

To bias the pins 21 outwardly (or upwardly) the base 25 is provided at circumferentially spaced positions with down-struck tongues 31 (Fig. 6) bearing resiliently on the insert 18. Upward movement of the horn button 21—25 and the pins 23 under the influence of the spring tongues 31 is limited by heads 32 provided on the lower ends of the pins 23 and engageable with the inner face of the insert 18.

The pins 24 have heads 27 and 32 and grooves similar to those of the pins 23, the heads 27 of the pins 24 being received in key-hole slots 28 provided at circumferentially spaced intervals in an integral annular flange 33 projecting inwardly from the body of the control ring 22.

Secured to the inner face of the insert 18 is a contact ring, designated in its entirety by the reference numeral 35, formed of resilient sheet-metal. Such ring is provided (see Fig. 7) with an outer annular series of arcuate slots 36, an intermediate series of arcuate slots 37 and an inner series of arcuate slots 38, the several series of slots being concentric with each other and with the ring. As shown, each series comprises three slots, and such number is preferred. Between adjacent ones of the intermediate slots 37, the contact ring is provided with holes 39 for the reception of members, shown as drive pins 40, by which the contact ring is secured in concentric position to the inner face of the insert 18. That portion of the ring 35 lying between each of the outer slots 36 and the periphery of the ring forms a contactor segment 41 which is engaged at or near its midpoint by one of the thrust pins 24. In similar fashion, that portion of the ring 35 which lies between the inner edge of the ring and each of the inner slots 38 forms a contactor segment 42 engageable at or near its midpoint by one of the pins 23. As shown, the heads 32 on the pins 23 and 24 are conical, and the contactor segments 41 and 42 are formed into a V-shaped cross-section to conform to the shape of the heads 32. The contactor segments, because of their V-shaped cross-section are relatively rigid and resist bending; but the remaining portions of the ring, because of the slots 36, 37, and 38, are flexible and bend readily to permit axial displacement of any contactor segment 41 or 42 to which pressure is applied by its associated pin 23 or 24. As the ring 35 is initially formed, all portions of it lie in a common plane except for those edge portions of the contactor segments which are bent out of such plane to impart the aforesaid V-shaped cross-section to the contactor segments. However, when the contact ring 35 is applied to the insert 38 the pin-heads 32 limit the approach of the ring to the insert; and when the pins 40 are driven home those portions 44 of the ring 35 lying between the outer and inner slots 36 and 38 will be distorted (see Fig. 4 and dotted-line showing in Fig. 9) and forced out of their original plane to stress the ring and hold the contactor segment 41 and 42 resiliently in engagement with the pin-heads 32.

Supported from the shroud collar 12 beneath the contact ring 35 is a contact plate 45 of insulating material carrying annular series of segmental contacts. As shown (Fig. 9) the contact plate 45 has an outer annular series of four segmental contacts 46, 47, 48, and 49 and an inner series of two segmental contacts 50 and 51. The contacts of the outer series lie on a radius equal to that of the contactor segments 41 of the contact ring 35, while the segments of the inner series lie on a radius corresponding to that of the contactor segments 42. The contact plate 45 is provided with a central opening for the reception of a bearing bushing 52 supported from the collar 12 and providing support for the upper end of the steering shaft 11, the collar 12 being provided with a sleeve 53 within which the bushing 52 is received. The plate 45 is provided with a notch 54 receiving a boss 55 which is provided on the bushing 52 and which also extends into a notch in the end of the sleeve 53 to locate the contact plate 45 in fixed, predetermined position about the axis of the steering column.

The connections between the pins 23 and the horn button and between the pins 24 and the control ring are sufficiently loose to permit both the horn button and the control ring to be rocked or tilted about any axis radial of the steering column. By such rocking or tilting movement of the horn button and control ring engagement of any selected fixed contact by the contact ring 35 can be effected by applying pressure to the control ring 22 or horn button at a point above such fixed contact. For example, if pressure is applied to the control ring 22 near its top as illustrated in Figs. 1 and 2, the upper pin 24 will be forced inwardly to bring the contactor segment 41 it engages into contact with the upper stationary contact segment 47. In similar fashion, pressure on the upper half of the horn button will tilt it to bring a contactor segment 42 into engagement with the upper contact 50 and pressure on its lower half will bring a contactor segment 42 into engagement with the lower fixed contact 51. It will be understood, of course, that the contactor segments 41 and 40 are all grounded through the insert 18 and that the fixed contacts 46 to 51 will be selectively connected to the signals which are to be controlled.

It will be noted that the point in the control ring or horn button to which pressure is applied to ground any one of the fixed contact segments 46 to 50 will be independent of the position of the steering wheel about its axis. That is, pressure near the top of the control ring 22 will always cause grounding of the segment 47, pressure on the left side of the control ring will always ground fixed contact 46, and so on. The same is true of the horn button, pressure on its upper portion always grounding the contact 50 and pressure on its lower portion always grounding the contact 51. It is therefore unnecessary for the operator to take account of the position of the steering wheel in controlling grounding of any fixed contact.

To prevent simultaneous grounding of any two adjacent fixed contacts, I may provide between them dead contacts 55 the outer surfaces of which are flush with those of the live contacts 46 to 51. If pressure is applied to the control ring 22 directly above one of the dead segments 55, the engagement of such dead segment with the depressed contactor 41 will prevent that contactor from engaging either of the live segments between which the engaged dead segment is located.

The comparative rigidity of the contactor segments 41 and 42, due to their V-shaped cross-section, is an important feature of my invention. Because of it, the simultaneous application of equal pressures on two adjacent thrust pins produces a maximum distortion of the contact ring 35 at a single point midway (circumferentially) between such two pins, and only a single fixed contact will be grounded. If the segments 41, for example, were freely flexible, pressure applied to the control ring 22 midway between two pins 24 would depress those pins and both of the segments 41 they engage would flex and engage the fixed contacts beneath them. With the segments 41 and 42 stiffened as a result of their cross-sectional shape, the maximum distortion of the contact ring occurs substantially directly below the point at which pressure is applied to the control ring. The same condition likewise exists in the case of pressure applied to the horn button.

The particular signaling devices controlled by my improved switch mechanism may take different forms. For example, grounding of the contact 46 may cause actuation of a left-turn signal, grounding of the contact 48 may cause actuation of a right-turn signal, and grounding of the contact 47 might cause actuation of a caution or stop signal. If the signals whose actuation is controlled by the ring 22 are of the type indicated, it is desirable that the signals proper be controlled through holding relays actuated by grounding of the contacts 46, 47, or 48 so that momentary depression of the control ring above any of such contacts will result in continued operation of the signal after pressure on the control ring has been realized. If such an arrangement is employed, grounding of the fourth fixed contact 49 of the outer series may energize a relay which will release any energized signal-actuating relay. The inner contacts 50 and 51 may be employed, either directly or through relays, to control the actuation of different horns.

I claim as my invention:

1. In combination with the stationary steering post and rotatable steering wheel of a vehicle, switch mechanism comprising a contact support fixedly mounted on said steering post, an annular series of circumferentially extending fixed contacts carried by said support, a resilient metal contact ring secured to said steering wheel for rotation therewith, said ring having an annular series of circumferentially extending contactor segments overlying but spaced axially from said series of fixed contacts and defined in part by a first annular series of circumferentially extending slots in the ring, said ring having a second annular series of circumferentially extending slots spaced radially from the slots of said first series and staggered angularly with respect to the slots of the first series whereby each slot of either series overlaps circumferentially two adjacent slots of the other series, said ring being secured to the steering wheel at points between adjacent slots of the second series, and thrust members respectively engaging said contactor segments and supported from said steering wheel, said thrust members being independently movable axially of said steering wheel to distort said contact ring into engagement with a selected fixed contact.

2. The invention of claim 1 with the addition of a control member operatively connected to said thrust members and selectively tiltable about any axis radial of the steering wheel.

3. In combination with the stationary steering post and rotatable steering wheel of a vehicle, switch mechanism comprising a contact support fixedly mounted on said steering post, an annular series of circumferentially extending fixed contacts carried by said support, an annular series of thrust members mounted in said steering wheel for independent movement axially thereof, a control member operatively connected to said thrust members and tiltable about any axis radial of the steering wheel to cause thrust-member movement, and contact means carried by said steering wheel in spaced relation to said fixed contacts, said contact means being engaged by said thrust members and being elastically distortable by movement of said thrust members into engagement with a selected one of said fixed contacts.

4. The invention of claim 3 with the addition that said control member has an annular series of circumferentially extending slots, said thrust members being cylindrical and provided at their outer ends with grooves defining heads, each of said slots having a wide portion large enough to pass a thrust-member head and a narrow portion narrower than such head but wide enough to receive the grooved portion of the thrust member, the grooved portions of the thrust members being received in the narrower portions of the respective slots, and releasable means for retaining said thrust members in the narrower slot-portions.

5. The invention of claim 4 with the addition that said last named means comprises a resilient tongue integral with the control member and engageable with the associated thrust-member head.

6. The invention of claim 3 with the addition that said control member is formed of resilient sheet metal and is provided with an annular series of out-struck fingers engaging said steering wheel to bias said control member and thrust members in a direction away from said contact support.

7. The invention of claim 1 with the addition that the metal of said contactor segments is bent to increase the effective thickness of said segments and thereby stiffen them.

8. In combination with the stationary steering post and rotatable steering wheel of a vehicle, switch mechanism comprising a contact support fixedly mounted on said steering post, an annular series of circumferentially extending fixed contacts carried by said support, a circular control member mounted in concentric position on said steering wheel for rotation therewith and tiltable about any axis radial of the steering wheel, contact means carried by said steering wheel in spaced relation to said fixed contacts, and means responsive to the application of axial pressure at a predetermined point in the circumference of said control member for causing engagement of said contact means with and only with that fixed contact approximately in line with said predetermined point.

References Cited in the file of this patent

UNITED STATES PATENTS

| | | |
|---|---|---|
| 1,774,375 | Hudson et al. | Aug. 26, 1930 |
| 1,908,803 | Wharam | May 16, 1933 |
| 2,673,906 | Butler | Mar. 30, 1954 |

FOREIGN PATENTS

| | | |
|---|---|---|
| 262,708 | Great Britain | Jan. 6, 1927 |